United States Patent
Upton et al.

(10) Patent No.: US 6,396,866 B1
(45) Date of Patent: May 28, 2002

(54) SYMMETRIC CHIRP COMMUNICATIONS ACQUISITION METHOD AND APPARATUS

(75) Inventors: Eric L. Upton, Redondo Beach; Kenneth L. Brown, Manhattan Beach; Martin P. Smith, Long Beach, all of CA (US); Thomas J. Kolze, Phoenix, AZ (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/071,574

(22) Filed: May 1, 1998

(51) Int. Cl.[7] ............................................. H04L 27/30
(52) U.S. Cl. .................... 375/139; 375/142; 375/150; 375/343; 375/369; 370/350; 370/503; 370/515
(58) Field of Search ................................ 375/139, 142, 375/152, 343, 369; 370/503, 515, 350

(56) References Cited

U.S. PATENT DOCUMENTS

| | | | | |
|---|---|---|---|---|
| 4,037,159 A | * | 7/1977 | Martin | 325/30 |
| 5,052,024 A | * | 9/1991 | Moran, III et al. | 375/7 |
| 5,113,278 A | * | 5/1992 | Degura et al. | 359/154 |
| 5,210,772 A | * | 5/1993 | Nakagawa | 375/1 |
| 5,278,862 A | * | 1/1994 | Vander Mey | 375/1 |
| 5,859,870 A | * | 1/1999 | Tsujimoto | 375/200 |
| 6,064,695 A | * | 5/2000 | Raphaeli | 375/230 |
| 6,075,812 A | * | 6/2000 | Cafarella et al. | 375/206 |

FOREIGN PATENT DOCUMENTS

| | | | | |
|---|---|---|---|---|
| WO | 96/02990 | * | 2/1996 | H04L/5/06 |
| WO | 96/19056 | * | 6/1996 | H04L/5/06 |

* cited by examiner

Primary Examiner—Stephen Chin
Assistant Examiner—Dac V. Ha
(74) Attorney, Agent, or Firm—McAndrews, Held & Malloy, Ltd.

(57) ABSTRACT

A method of acquiring a communications signal is provided. The method includes the steps of storing a forward chirp sync segment (106) of an auto-correlating forward chirp sync (102) and storing a reverse chirp sync segment (108) of a symmetric auto-correlating reverse chirp sync (104). A header comprising of either a forward chirp sync FCS (102) or a reverse chirp sync RCS (104), a predetermined number of data blocks comprising a data frame (308), and the symmetric auto-correlating trailer is received. The header, the data blocks, and the symmetric trailer are susceptible to frequency error. The method correlates the FCS segment (106) with the auto-correlating FCS (102) to provide a FCS correlation signal (312) and correlates the RCS segment (104) with the auto-correlating RCS (108) to provide a RCS correlation signal (314). The method determines the frequency error, symbol timing, and frame timing based upon the FCS correlation signal (312) and the RCS correlation signal (314).

22 Claims, 7 Drawing Sheets

SYMMETRIC CHIRP COMMUNICATIONS ACQUISITION METHOD AND APPARATUS

This invention was made with government support under contract No. F30602-95-C-0265, awarded by the Department of Defense. The government has certain rights in this invention.

BACKGROUND OF THE INVENTION

Modern communications techniques transmit information efficiently by modulating the information before transmission. Modulation results in signal segments (generally referred to as symbols) which may represent a single bit or multiple bits of information. For example, in QPSK modulation, each symbol represents two bits of information. The symbols are grouped into sets containing predetermined numbers of symbols. The sets are called frames and each frame typically contains specific header information including, for example, identification, routing, or error detection/correction coding. Furthermore, the symbols are typically frequency shifted by a carrier into an appropriate band (for example, the bandwidth allocated to an FM radio channel) before or during transmission.

At the receiver, the transmitted signal must be acquired before the information may be extracted. Acquiring a signal includes determining the carrier frequency, determining the symbol timing, and determining the frame timing so that the receiver may synchronize with the transmitted signal. Once the transmitted signal is acquired, the receiver must maintain synchronization as well. Acquiring the transmitted signal and maintaining synchronization, however, are often extremely difficult.

In determining the carrier frequency the receiver must be able to account for many types of masking and interference. For example, where the receiver or transmitter is moving relative to the other, the true carrier frequency may be masked by a Doppler shift. Other factors may also affect the carrier frequency, including inaccurate time bases at the transmitter, atmospheric conditions such as ambient temperature, and multi-path interference.

Assuming that the receiver has acquired the carrier frequency, the receiver must then synchronize with the symbol timing in the transmitted frame, a process often referred to as clock recovery. In the past, clock recovery has typically involved trial and error demodulation of the transmitted signal at the receiver in order to determine where individual symbol modulation begins and ends. For example, when a particular trial demodulation yields incorrect data, the receiver either advances or retards its approximation to the symbol timing and makes another attempt. Once the receiver has acquired the symbol timing, it next has to determine the frame timing.

Acquiring frame timing is analogous to determining where a complete message starts and stops. Knowing where the message starts allows the receiver to examine the frame header information commonly included with the frame. The frame header information, for example, is often important in determining what, if anything, the receiver should do with the frame. In general, once the symbol timing is acquired, the receiver may monitor the transmitted data until it recognizes the next start of frame.

Because a receiver typically does not acquire the carrier frequency and symbol timing immediately, numerous symbols or frames may pass by before the receiver is able to recover information. In burst communications, in which data is transmitted in short segments or bursts, the delay incurred at the receiver to acquire the carrier frequency, symbol timing, and frame timing may prevent the receiver from recovering any data at all. Similarly, data may also be lost in continuous transmission systems during receiver start up.

In both continuous and burst transmission systems, the receiver may also lose data trying to resynchronize to the transmitted data. Resynchronization is necessary, for example, when a drop out occurs during reception. Typical sources of drop out include physical obstructions in the signal path, for example trees, buildings, and tunnels, as well as atmospheric and electrical disturbances between the receiver and transmitter. In order to cope with drop outs, transmitters typically intersperse additional synchronization information during the transmission of normal data.

In the past, during synchronization and resynchronization, receivers have typically employed a frequency sweep technique in order to acquire the carrier frequency. In the frequency sweep technique, the receiver hypothesizes the correct carrier frequency and searches many frequencies over a predetermined uncertainty range. At each hypothesis, the receiver must try to acquire symbol timing and frame timing. If the hypothesis fails, the receiver must continue trying to acquire the carrier frequency. In the past, therefore, the frequency acquisition process often requires substantial time and processing power.

To help receivers acquire the carrier frequency, transmitters typically transmit long preambles or headers of modulated information before the frame. The headers required to allow receivers to acquire the carrier frequency with acceptable probability often introduce an overhead of as much as 30% compared to the actual data in a frame. Thus, a significant amount of bandwidth and processing time is used simply to allow the receiver to acquire the transmitted signal as opposed to actually communicating useful information. In fact, the processing power required to acquire and maintain synchronization with the transmitted signal may surpass that required to decode the actual data by a factor of 10 or more.

Therefore, a need remains in the industry for an improved signal acquisition method which overcomes the disadvantages discussed above and previously experienced.

BRIEF SUMMARY OF THE INVENTION

It is an object of the present invention to allow a receiver to acquire a transmitted signal.

It is a further object of the present invention to provide a receiver with an auto-correlation technique that may be used to acquire a transmitted signal.

It is another object of the present invention to reduce the time required for receiver to acquire a transmitted signal.

It is another object of the present invention to reduce the processing required for receiver to acquire a transmitted signal.

Still another object of the present invention is to reduce the cost and complexity associated with transmitters and receivers in a communications system.

It is an object of the present invention to significantly reduce the header required for a receiver to accurately acquire a transmitted signal.

It is yet another object of the present invention to allow a receiver to determine the carrier frequency and frame timing of a transmitted signal using symmetric chirp signals.

The signal acquisition technique of the present invention includes transmitting an auto-correlating header ("header") followed by a data block of predetermined length followed by a symmetric auto-correlating ("trailer"). A series of such framed data blocks comprises a data frame. The lengths of the header and trailer are predetermined and may, for example, be implemented as symmetric chirp (swept frequency) signals.

At the receiver, a header reference segment ("header reference") and a trailer reference segment ("trailer reference") of the auto-correlating header and auto-correlating trailer are stored. Upon reception of the transmitted header, data block, and trailer, the receiver correlates the header reference with the header thereby providing a header correlation signal. In addition, the receiver correlates the trailer segment with the trailer to provide a trailer correlation signal. Peaks in the header correlation signal and trailer correlation signal are examined in conjunction with the known predetermined data block, header, and trailer lengths to acquire the data blocks and data frame. In particular, synchronization is determined for the individual data blocks comprising frames. In addition, the carrier frequency offset of the data blocks and data frame as well as the timing and positioning of the data frame itself are determined.

DETAILED DESCRIPTION OF THE INVENTION

Figure 1:
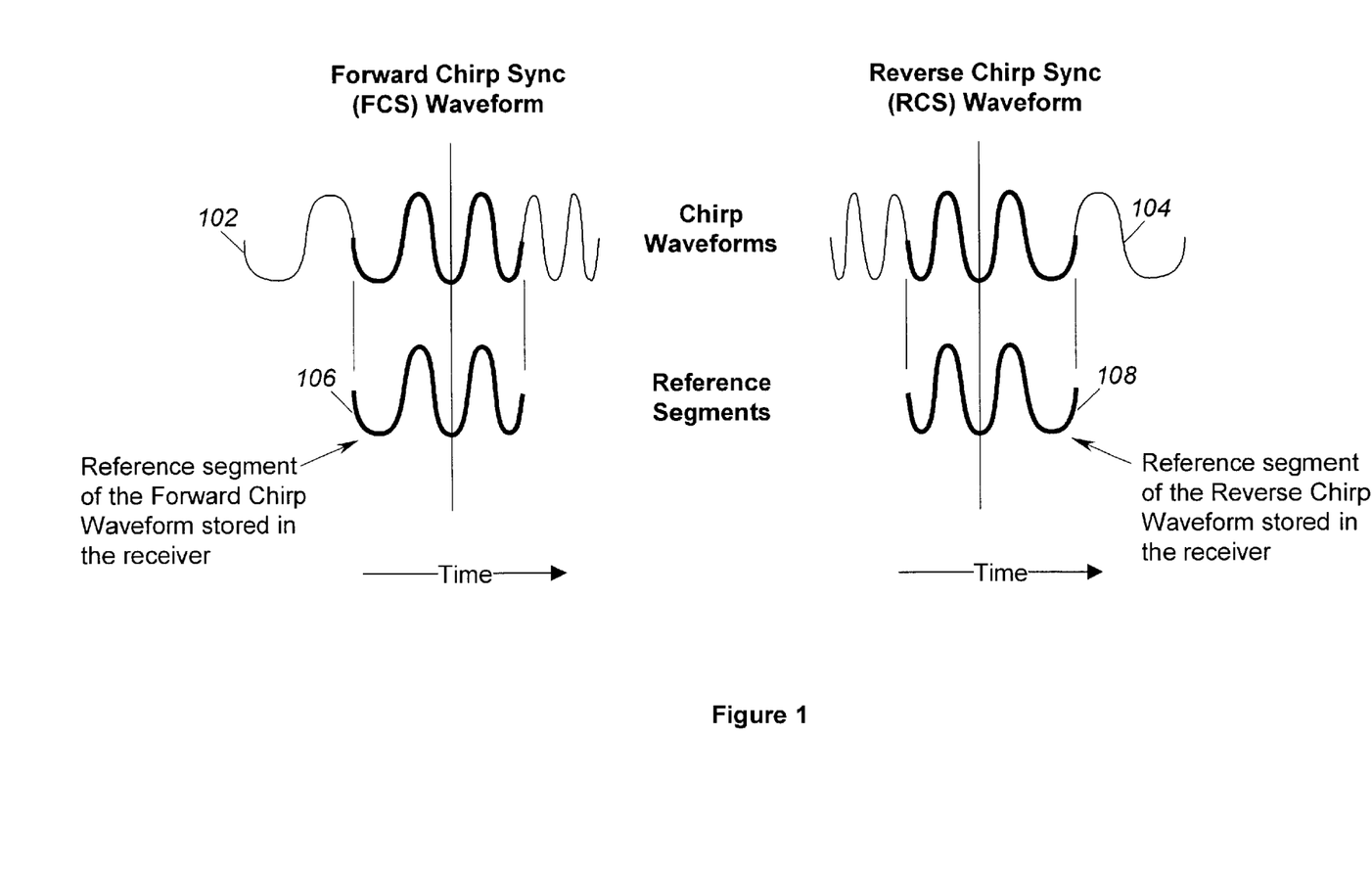
FIG. 1 illustrates a chirp sync implementation of a header, a trailer, and reference segments used for comparison in the receiver.

Turning now to FIG. 1, FIG. 1 shows a diagram of a forward chirp sync waveform 102 ("FCS") and reverse chirp sync waveform 104 ("RCS"). In addition, a forward chirp waveform reference segment 106 ("FCS reference") and a reverse chirp waveform reference segment 108 ("RCS reference") are also shown.

The FCS 102 and RCS 104 possess symmetric auto-correlation properties as will be described in more detail below. The FCS 102 may be implemented, for example, as a chirp sync waveform which starts at a predetermined frequency and sweeps continuously forward to a second, higher frequency. The RCS 104 may then be implemented as the mirror image (symmetric) version of the FCS 102. A header consists of either an RCS or an FCS and precedes the data block. A trailer consists of the symmetric waveform of the header and follows the data block. For example, if the header consists of an RCS, then the trailer will be an FCS. The specific example of an RCS and an FCS pair will be used from this point forward. It is noted, however, that the FCS and the RCS are only one example of many possible auto-correlating headers and symmetric auto-correlating trailers.

The range of frequencies over which the FCS and the RCS is swept depends on the ideal carrier frequency and on the potential range of frequency error in the carrier frequency as received at the receiver. For example, with an expected carrier frequency of 100 MHz and a range of frequency error of plus or minus 1 MHz, the FCS may sweep from 99 MHz to 101 MHz, and the RCS may sweep from 101 MHz to 99 MHz.

In principle, the potential range of frequency error may not have an easily definable upper or lower bound. As a result, an upper or lower frequency error range may be chosen to provide a given probability that the frequency error is not exceeded. Thus, for example, the 1 MHz frequency error in the above example may correspond to a 99% probability that the frequency of the transmitted signal at the receiver lies with the range 99–101 MHz.

A portion of the FCS is extracted to form the FCS reference 106 and a portion of the RCS is extracted to form the RCS reference 108. Preferably, the FCS reference 106 and the RCS reference 108 are centered at the center frequency of the FCS and the RCS and extend in frequency to either side over a subset of the frequency range of the FCS and the RCS. For example, assuming an FCS and an RCS swept from 99 MHz to 101 MHz, the FCS reference 106 frequency extent may range from 99.8 MHz to 100.2 MHz. The RCS reference 108 frequency extent may then range from 100.2 MHz to 99.8 MHz.

The choice of frequency extent of the FCS reference 106 and the RCS reference 108 depends in part on the properties of the correlation procedure which will be discussed in more detail below. Generally, however, the correlation procedure may be implemented as the convolution of the FCS reference 106 and RCS reference 108 with the FCS and RCS. A discrete point by point dot product may also be used. The correlation procedure, for example, produces a correlation signal which peaks at the location that the FCS reference segment 106 matches the FCS. Thus, if the frequency extent is too narrow, the FCS reference 106 and the RCS reference 108 will correlate against the FCS and the RCS at many positions. On the other hand, if the frequency extent is too wide, then neither the FCS reference 106 nor the RCS reference 108 will correlate with the FCS or the RCS if there is any significant frequency error during transmission.

Figure 2:
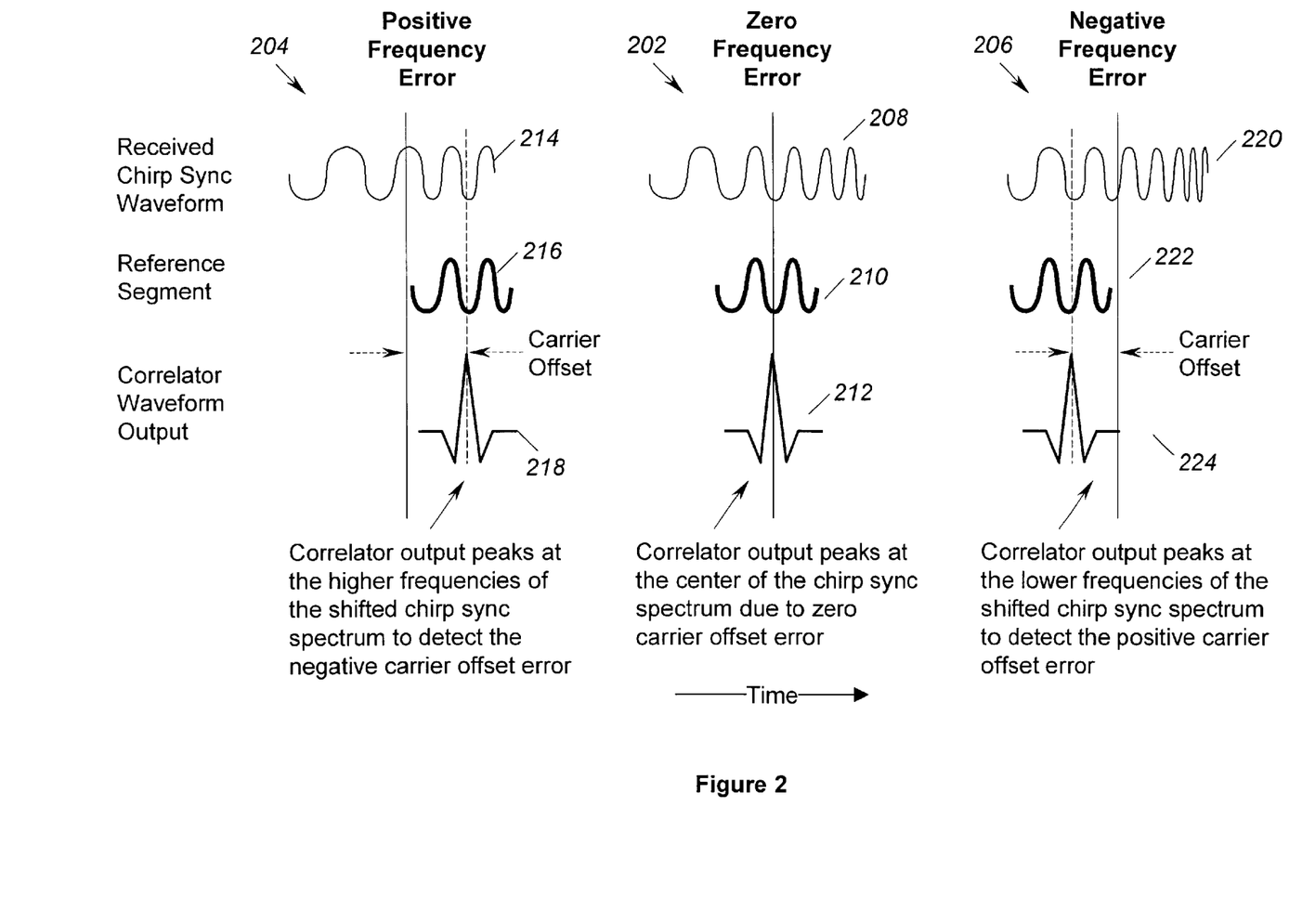
FIG. 2 shows the effect on the correlation between the segments and the header and trailer caused by frequency shifts during transmission.

Turning now to FIG. 2, a diagram showing the effects of transmission frequency errors on the correlation signal is shown. A zero frequency error shift 202, a positive frequency error shift 204, and a negative frequency error shift 206 are shown in FIG. 2. The zero frequency error shift 202 includes a zero shift FCS 208 (as received), a zero shift FCS reference segment 210 (stored in the receiver), and a zero shift correlator output 212. The positive frequency error shift 204 includes a positive shift FCS 214 (as received), a positive shift FCS reference segment 216 (stored in the receiver), and a positive shift correlator output 218. The negative frequency error shift 206 includes a negative shift FCS 220 (as received), a negative shift FCS reference segment 222 (stored in the receiver), and a negative shift correlator output 224.

The reference segments 210, 216, and 222 are typically identical. In other words, only a single reference segment is stored and correlated against received FCS signals at the receiver. Preferably, the reference segment that is stored, as noted above (the FCS reference 106), represents a section of the ideal (zero frequency shift) carrier frequency with a predetermined frequency extent. Similarly, only a single reference segment (for example, the RCS reference segment 108) is typically stored and correlated against received RCS signals at the receiver.

Referring to the zero frequency error shift 202 in FIG. 2, the zero shift correlator output 212 indicates that the zero shift reference segment 210 most closely matches the zero shift FCS 208 at the center frequencies. As the zero shift reference segment 210 is correlated with portions of the zero shift FCS 208 to either side, the match is less exact, and the correlator output falls off. The magnitude of the peak in the correlation output 210 may be adjusted to any predetermined level, for example, by changing the frequency extent of the reference segments, or scaling the coefficients in the correlation process discussed below.

The receiver will typically not receive an FCS with zero frequency error. Is most instances, the frequency of the transmitted signals will shift in one direction or the other as they propagate toward the receiver. As an example, the positive frequency error shift 204 illustrates the reception of a positive shift FCS 214 (caused, for example, by the receiver moving away from the transmitter). As a result, the frequencies throughout the positive shift FCS 214 appear to the receiver to be reduced. The positive shift correlator output 218 therefore peaks at what ordinarily would be the higher frequencies of an FCS.

In a similar fashion, the negative frequency error shift 206 may be caused by the receiver moving toward the transmitter. As a result, the frequencies throughout the positive shift FCS 214 appear to the receiver to be increased. The positive shift correlator output 218 therefore peaks at what ordinarily would be the lower frequencies of the FCS. Because RCS signals are designed as symmetric versions of FCS signals, the correlator peak for the RCS moves in the opposite direction as the correlator peak for the FCS for frequency errors in a given direction.

Figure 3:
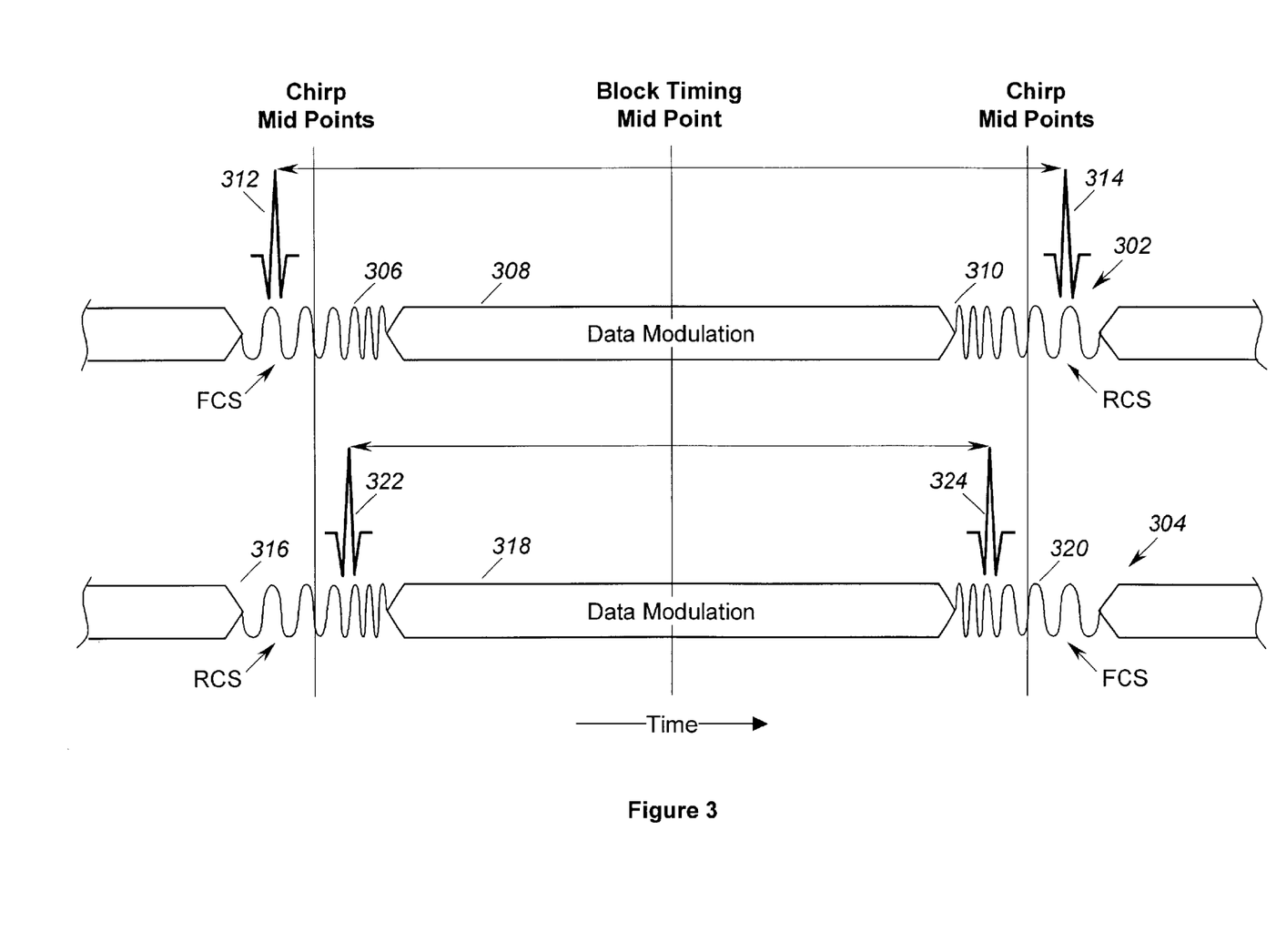
FIG. 3 shows how a block timing midpoint is determined based upon peaks in the header correlation signal and peaks in the trailer correlation signal.

Turning now to FIG. 3, a diagram of a first framed data block 302 affected by negative frequency error shift and a second framed data block 304 also affected by a negative frequency error shift is shown. The first framed data block 302 is transmitted as a first FCS 306, a data block 308 (which may correspond to a symbol of information), and a first RCS 310. In this example, the header is an FCS (FCS 306). The trailer is an RCS (RCS 310). A first FCS correlator peak 312 and a first RCS correlator peak 314 function as described above to indicate the presence of the negative frequency error shift.

Similarly, the second framed data block 304 is transmitted as a second RCS 316, a data block 318, and a second FCS 320. In this example, the header is an RCS (RCS 316). The trailer is an FCS (FCS 320). A second RCS correlator peak 322 and a second FCS correlator peak 324 also indicate the presence of the negative frequency error shift. Note that in both the first framed data block 302 and the second framed data block 304, the receiver may detect the center of the data block as the midpoint between the two correlator peaks. Thus, either a data block framed by an FCS header and an RCS trailer or a data block framed by an RCS header and an FCS trailer effectively communicates to the receiver where the center of the framed data block is located. It is also noted that the function of the FCS and the RCS are completely independent of the data blocks 308 and 318. In other words, the data blocks 308 and 318 may contain any modulation or no modulation without influencing the operation of the correlator outputs.

Figure 4:
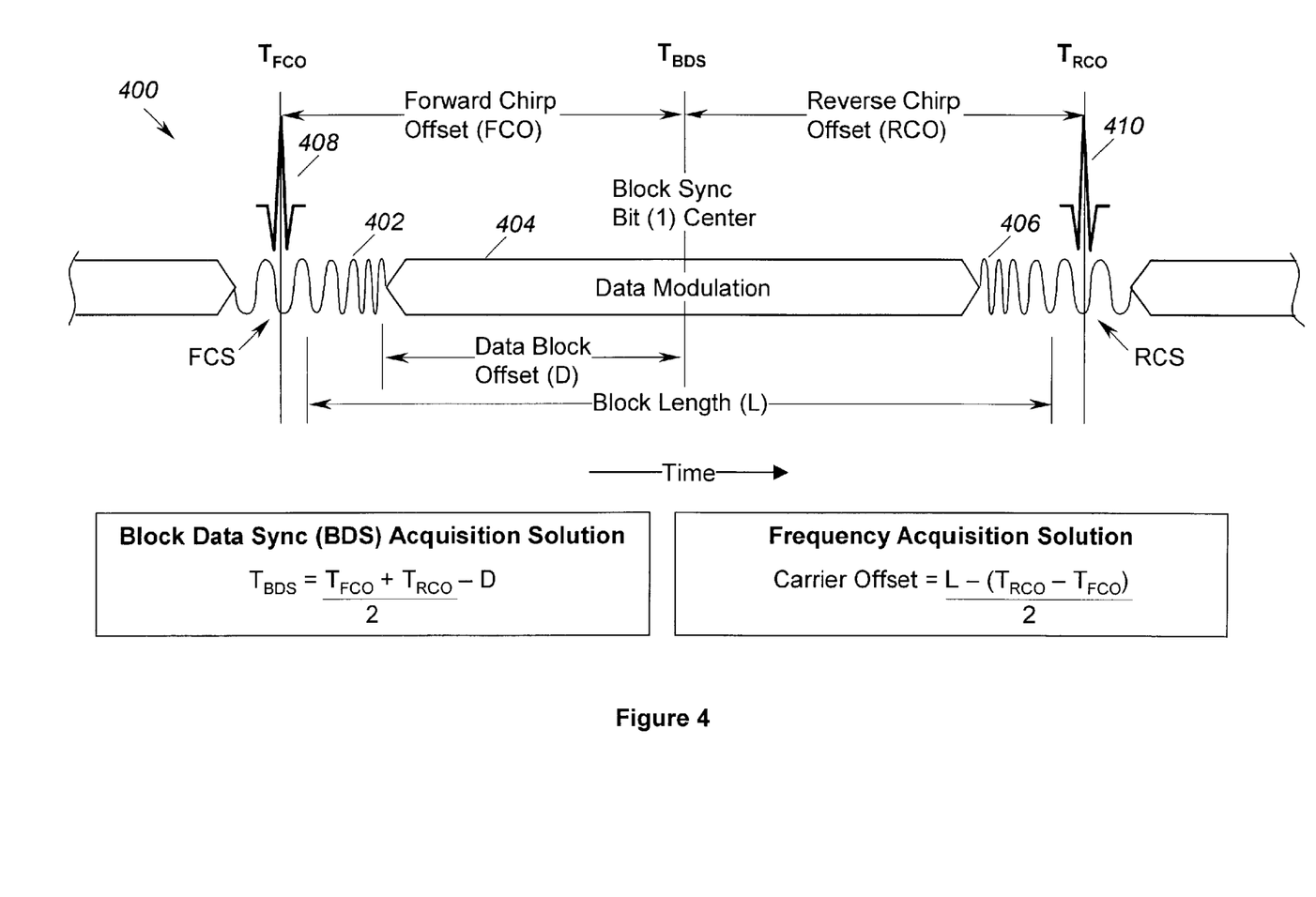
FIG. 4 illustrates the definition of a frame sync 1-bit with the associated frequency and block data sync acquisition.

Turning now to FIG. 4, a diagram of a frame sync 1-bit 400 and associated timing is shown. A frame sync 1-bit is defined as a FCS header 402 followed by a data block 404 followed by an RCS trailer 406. An FCS correlator output 408 and an RCS correlator output 410 are also shown (and illustrate a negative frequency error shift affecting the frame sync 1-bit 400). As illustrated in FIG. 4, the FCS correlator output 408 and the RCS correlator output 410 may be used to determine a block data sync solution ($T_{BDS}$) as well as a frequency acquisition solution (Carrier Offset). $T_{BDS}$ represents the time at which the data block 404 begins and Carrier Offset represent the amount of frequency error in the frame sync 1-bit.

At time $T_{FCO}$ (referenced from time 0) the FCS correlator output 408 peaks and at time $T_{RCO}$ (referenced from time 0) the RCS correlator output 410 peaks. As illustrated in FIG. 4, $T_{BDS}$ may be determined as $(T_{FCO}+T_{RCO})/2-D$, where D is a predetermined quantity representing the time required to transmit half of the data block 404. The Carrier Offset is determined as $L-(T_{RCO}-T_{FCO})/2$, where L is a predetermined quantity representing the block length (defined as the time between the center of the FCS 402 and the RCS 406). When there is zero frequency shift error, $(T_{RCO}-T_{FCO})-L=0$ and the Carrier Offset is zero, as expected.

Figure 5:
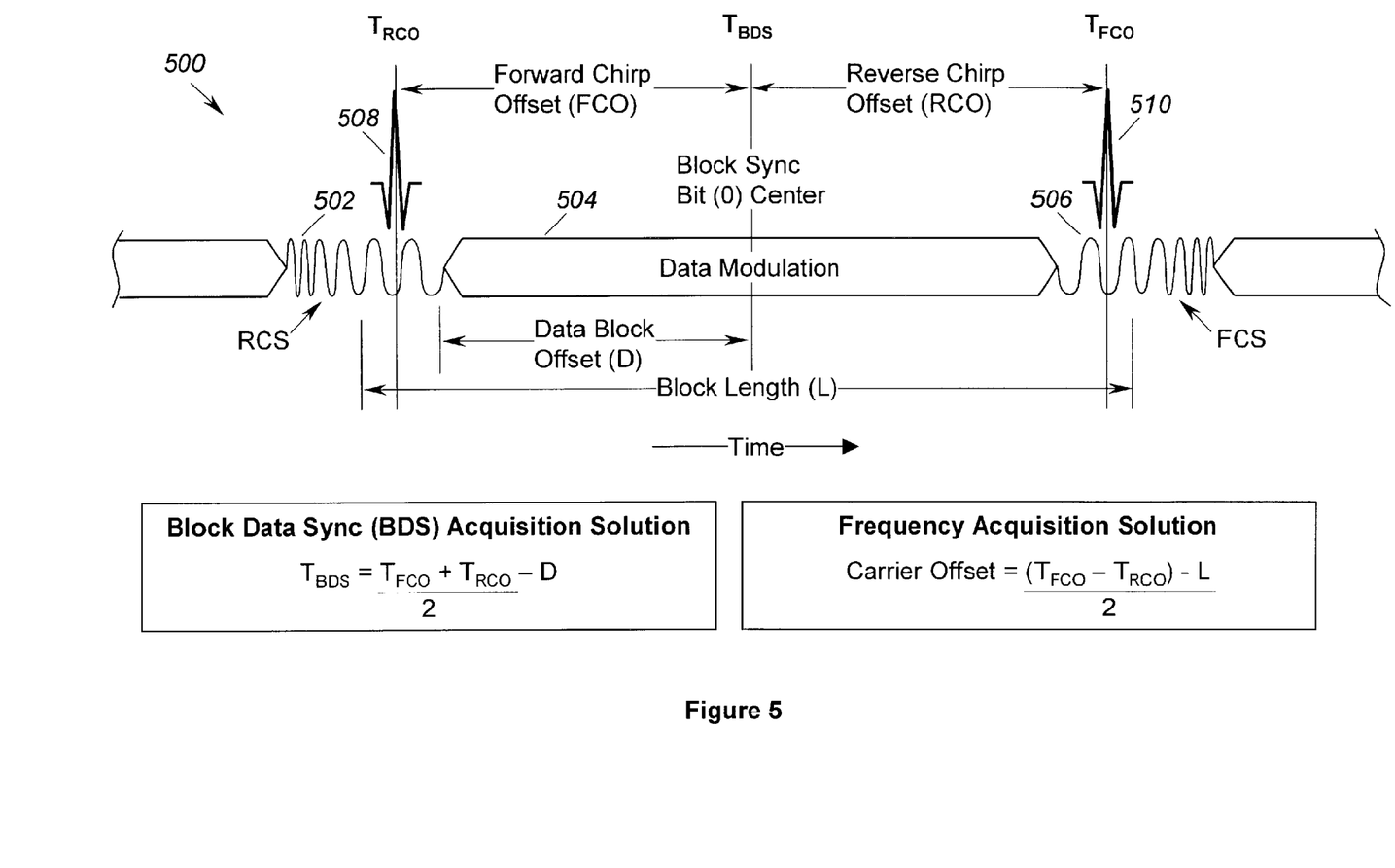
FIG. 5 shows the definition of a frame sync 0-bit with the associated frequency and block data sync acquisition.

Turning now to FIG. 5, a diagram of a frame sync 0-bit 500 and associated timing is shown. A frame sync 0-bit is defined as an RCS header 502 followed by a data block 504 followed by an FCS trailer 506. An RCS correlator output 508 and an FCS correlator output 510 are also shown (and illustrate a negative frequency error shift affecting the frame sync 1-bit 500). As illustrated in FIG. 4, the RCS correlator output 508 and the FCS correlator output 510 may be used to determine a block data sync solution ($T_{BDS}$) as well as a frequency acquisition solution (Carrier Offset). $T_{BDS}$ represents the time at which the data block 504 begins and Carrier Offset represent the amount of frequency error in the frame sync 0-bit.

At time $T_{FCO}$ (referenced from time 0) the RCS correlator output 508 peaks and at time $T_{RCO}$ (referenced from time 0) the FCS correlator output 510 peaks. As illustrated in FIG. 5, $T_{BDS}$ may be determined as $(T_{FCO}+T_{RCO})/2-D$, where D is a predetermined quantity representing the time required to transmit half of the data block 504. The Carrier Offset is determined as $L-(T_{RCO}-T_{FCO})/2$, where L is a predetermined quantity representing the block length (defined as the time between the center of the FCS 502 and the RCS 506). When there is zero frequency shift error, $L-(T_{FCO}-T_{RCO})=0$ and the Carrier Offset is zero, as expected.

An x-bit may be defined as an FCS header followed by a data block followed by an FCS trailer as well as an RCS header followed by a data block followed by an RCS trailer and may be used to indicate the presence of a signal. The presence of a signal and therefore repeated FCS or RCS signals may be detected because the correlator output shifts for an FCS header and an FCS trailer pair or RCS header and an RCS trailer pair will be in the same direction.

Figure 6:
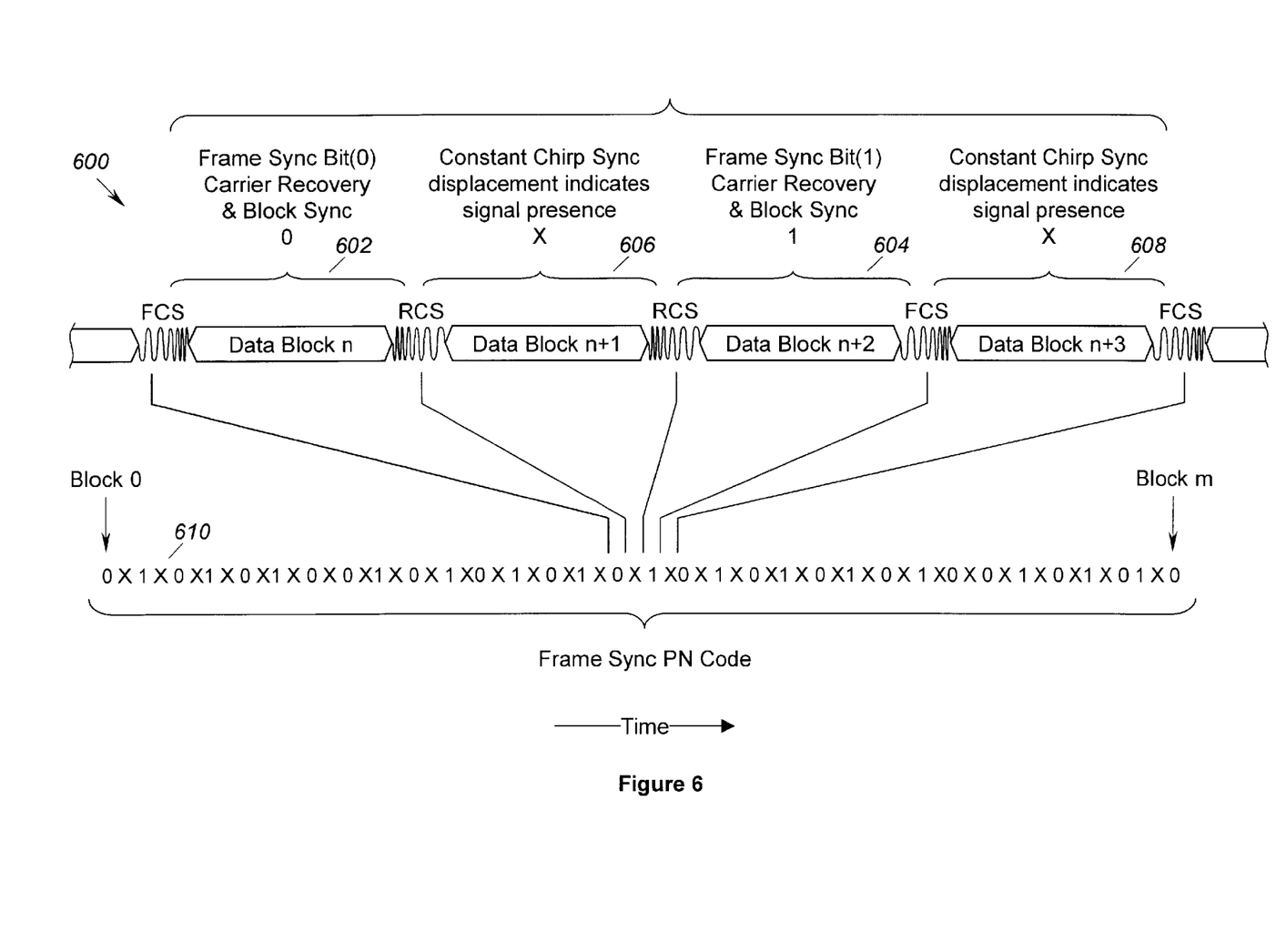
FIG. 6 illustrates frame synch detection using a sequence of frame sync 0-bits, 1-bits, and x-bits that define a frame synch PN code.

Turning now to FIG. 6, a technique for detecting frame synchronization using a pseudo random number (PN) code is depicted. Any other unique code could also be used. In FIG. 6, a frame sequence 600 is shown including a 0-bit 602, a 1-bit 604, a first X-bit 606 and a second X-bit 608. A portion of a PN code 610 that will be used for frame sync is also shown. The first X-bit 606 is formed from an RCS header followed by an RCS trailer, and the second X-bit 608 is formed from an FCS header followed by another FCS trailer.

A PN code has a length that is $2^n-1$ (for example 127 bits or 2 to the seventh power minus one) and a predetermined pattern that has the property that any n bits of the pattern define a unique position in the pattern. As a result, a receiver need only acquire n consecutive bits of the PN code in order to determine where in the sequence it has acquired the signal. Typically, a frame is constructed from multiple data blocks. A PN code can be used to form a series of 1-bits, 0-bits, and X-bits defining a frame that will allow the receiver to detect the signal and determine the carrier frequency, data block sync timing, signal presence, and frame sync.

As an example, in FIG. 6, the receiver is shown detecting a 0-bit 602, a first X-bit 606, a 1-bit 604, and a second X-bit 608. The detected bits are matched to a unique location in the PN code 610 to determine how far along in the frame the receiver is when it has acquired the signal. In principle, a greater number of bits (n, as noted above) may be used to establish a match in the PN code 610. Knowing the predetermined frame length, the receiver may then start decoding data immediately, delay until the start of the next frame to begin decoding data, or recover from signal fading or dropout by reestablishing its position within the frame.

Figure 7:
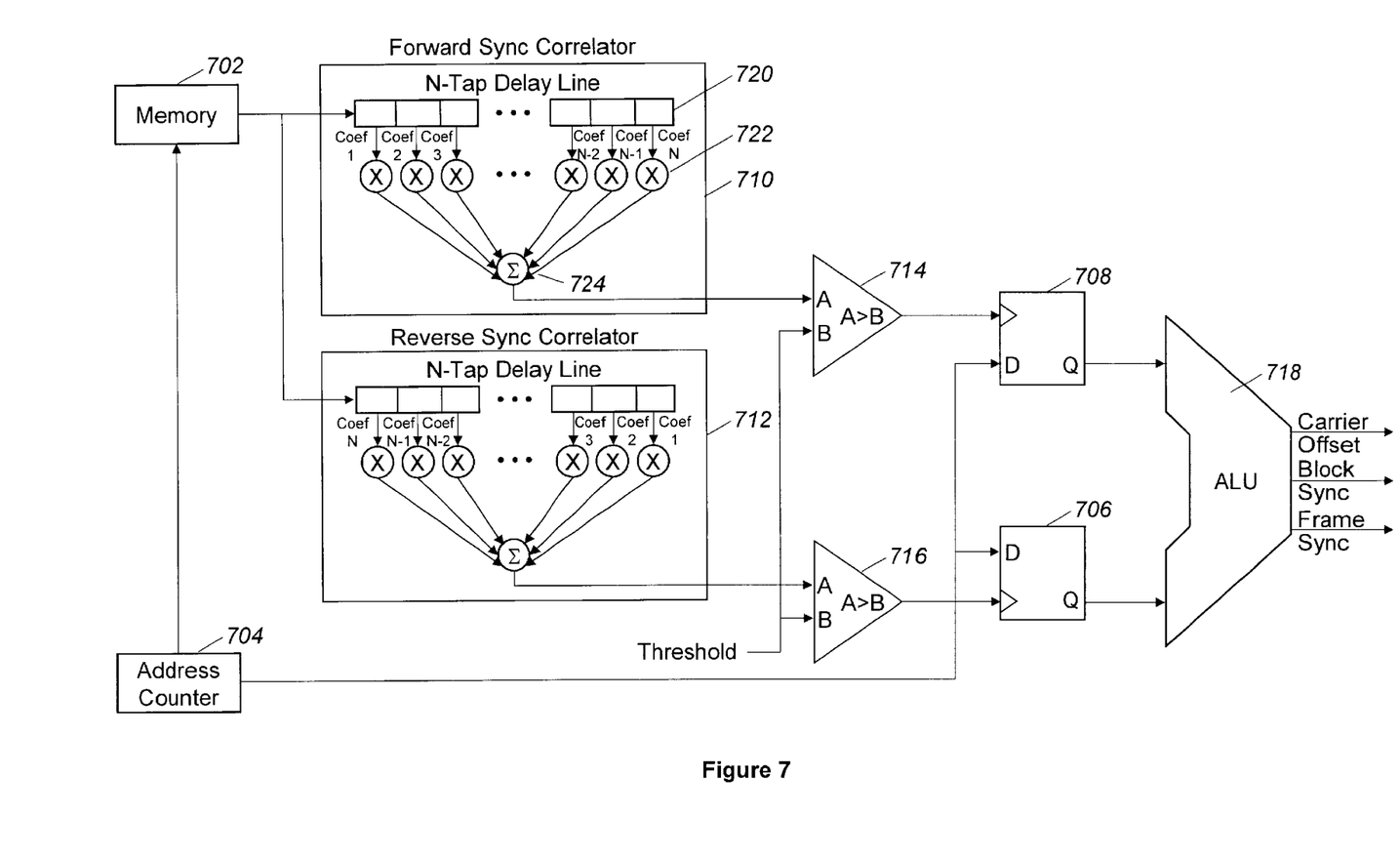
FIG. 7 shows one implementation of a correlation and synchronization processor at the receiver.

Turning now to FIG. 7, a diagram of one possible implementation of a correlation and signal acquisition circuit 700 is shown. The circuit 700 includes a memory 702, and an address counter 704 connected to two sets of D-flip flops 706 and 708. The circuit 700 also includes an FCS correlator 710, an RCS correlator 712, and a pair of comparators 714 and 716. An Arithmetic Logic Unit (ALU) 718 is connected to the outputs of the D-flip flops 706 and 708.

The FCS correlator 710 includes an N-tap delay line 720 with each tap connected to a multiplier in a multiplier array 722. The individual multipliers form the product of their associated tap and coefficient input. Because the process is an auto-correlation, the coefficient inputs represent discrete sample points of the FCS reference segment and the RCS reference segment, for example, the FCS reference segment 106 and the RCS reference segment 108. The outputs of the multiplier array 722 are added by the summer 724. Because the FCS correlator 710 and the RCS correlator 712 may operate and may be constructed in a similar fashion, only the operation of the FCS correlator 710 will be discussed below.

As the receiver stores signal samples in the memory 702, the address counter 704 cycles through the signal samples which are loaded into the N-tap delay line 720. Each time a new sample is loaded, the oldest sample is discarded and the summer 724 produces a new FCS correlator 710 output. As discussed above, the correlator output generally peaks when the coefficients representing the stored FCS reference segment most precisely match the FCS as represented by the signal samples in the memory 702.

When the FCS correlator 710 output exceeds a predetermined threshold (set by the threshold input connected to the comparator 714), the address at which the best match to the FCS reference segment occurs is latched by the set of D-flip flops 708. Because sampling typically occurs at a regular rate, the address of the match may be converted to the time of the match by the ALU 718. When, in addition, the RCS correlator 712 output exceeds the threshold, the address of the RCS match is provided to the ALU 718 in similar fashion. Then ALU 718 may then perform the calculations described above to acquire the signal.

As an example, the FCS correlator 710 and RCS correlator 712 may use 128 coefficients to represent the header or trailer reference. The FCS or RCS may then be designed to extend for a period of 256 sample points. The sampling rate may be chosen such that each tap in the N-tap delay line 720 represents one KHz of frequency uncertainty. The header and trailer reference then cover a total frequency uncertainty of 128 KHz.

The structure disclosed above with respect to FIG. 7 may be implemented in a variety of manners. For example, discrete logic may be used for each structure, or all of the structures may be implemented in a single digital signal processor (DSP). Because hardware is equivalent to software, any of the structure or equations discussed above may be implemented as any mixture of hardware elements and software elements.

The structure disclosed above with respect to FIG. 7 is only one of many possible implementations of a correlator suitable for use with the present invention. Other implementations are also suitable, some employing widely divergent technologies. For example, the invention described above may be practiced as part of a fiber optics communication system or a surface acoustic wave (SAW) system.

In a fiber optics communication system, the received waveform is typically coupled into a fiber optic cable. A Bragg grating may then be placed in the fiber optic cable and may function as a correlator. A suitable Bragg grating may be prepared using a holographic technique that writes a mask into the grating in the shape of a reference segment. The grating returns a maximum amount of light energy when the transmitted waveform most closely matches the reference segment written into the grating. Receiver electronics on one end of the fiber may then detect the Bragg correlator output peaks and obtain the frequency error, symbol timing, and frame timing as disclosed above with reference to FIGS. 4, 5, and 6.

As an alternative, a received signal may be launched onto the surface of a material suitable for propagating surface acoustic waves (SAWs). A correlator for the SAWs may then be constructed with detection fingers placed on the surface of the material. The detection fingers are generally laid out in the shape of the reference segment and may be used to provide a correlator output. Receiver electronics connected to the SAW material may then detect the correlator output peaks and obtain the frequency error, symbol timing, and frame timing as disclosed above with reference to FIGS. 4, 5, and 6.

What is claimed is:

1. A method of acquiring a communications signal, the method comprising the steps of:
   a) storing a segment of an auto-correlating forward chirp sync waveform (FCS);
   b) storing a segment of a symmetric auto-correlating reverse chirp sync waveform (RCS);
   c) receiving said auto-correlating FCS, a predetermined number of symbols comprising a data frame, and said symmetric auto-correlating RCS, said auto-correlating FCS, said symbols, and said symmetric auto-correlating RCS susceptible to frequency error;
   d) correlating said FCS segment with said auto-correlating FCS to provide a FCS correlation signal;
   e) correlating said RCS segment with said auto-correlating RCS to provide a RCS correlation signal; and
   f) determining said frequency error based upon said FCS correlation signal and said RCS correlation signal.

2. The method of claim 1, further comprising the step of:
   g) determining symbol timing for said symbols based upon said FCS correlation signal and said RCS correlation signal.

3. The method of claim 2, further comprising the step of:
   h) determining frame timing for said data frame based upon said FCS correlation signal and said RCS correlation signal.

4. The method of claim 1, further comprising the step of:
g) determining frame timing for said data frame based upon said FCS correlation signal and said RCS correlation signal.

5. The method of claim 1, wherein said receiving step receives a forward chirp sync waveform representing said auto-correlating FCS.

6. The method of claim 5, wherein said receiving step receives a reverse chirp sync waveform representing said symmetric auto-correlating RCS.

7. The method of claim 6, further comprising the step of:
g) determining symbol timing for said symbols based upon said FCS correlation signal and said RCS correlation signal.

8. The method of claim 6, further comprising the step of:
g) determining frame timing for said data frame based upon said FCS correlation signal and said RCS correlation signal.

9. The method of claim 8, further comprising the step of:
h) determining symbol timing for said symbols based upon said FCS correlation signal and said RCS correlation signal.

10. The method of claim 1, wherein said correlating step comprises the steps of:
a) providing a first Bragg grating written with said FCS segment; and
b) detecting energy returned by said first Bragg grating in response to said auto-correlating FCS.

11. The method of claim 10, wherein said correlating step comprises the further steps of:
c) providing a second Bragg grating written with said RCS segment; and
d) detecting energy returned by said second Bragg grating in response to said symmetric auto-correlating RCS.

12. The method of claim 1, wherein said correlating step comprises the steps of:
a) providing a surface acoustic wave material;
b) forming a first series of detection fingers on said surface acoustic wave material, said first series of detection fingers representing said FCS reference; and
c) detecting energy returned by said first series of detection fingers in response to said auto-correlating FCS.

13. The method of claim 12, wherein said correlating step comprises the further steps of:
a) forming a second series of detection fingers on said surface acoustic wave material, said second series of detection fingers representing said RCS reference; and
b) detecting energy returned by said second series of detection fingers in response to said symmetric auto-correlating RCS.

14. A synchronization processor comprising:
a memory storing a plurality of received signal segments;
an address counter connected to said memory;
a forward sync correlator connected to said memory and responsive to a first plurality of coefficients representing an auto-correlating header segment;
a reverse sync correlator connected to said memory and responsive to a second plurality of coefficients representing a symmetric auto-correlating trailer segment;
a peak detection circuit connected to said forward sync correlator and said reverse sync correlator; and
an arithmetic logic unit connected to said peak detection circuit.

15. The synchronization processor of claim 14, wherein said forward sync correlator comprises a first delay line, a first plurality of multipliers connected to said first delay line, and a first summer connected to said first plurality of multipliers.

16. The synchronization processor of claim 15, wherein said reverse sync correlator comprises a second delay line, a second plurality of multipliers connected to said second delay line, and a summer connected to said second plurality of multipliers.

17. The synchronization processor of claim 14, wherein a digital signal processor comprises said memory, said address counter, said forward sync correlator, said reverse sync correlator, said peak detection circuit, and said arithmetic logic unit.

18. The synchronization processor of claim 14, wherein said peak detection circuit comprises a first comparison circuit connected to said forward sync correlator, and a second comparison circuit connected to said second sync correlator.

19. The synchronization processor of claim 18, wherein said peak detection circuit further comprises a predetermined threshold input connected to said first comparison circuit and said second comparison circuit.

20. The synchronization processor of claim 16, wherein said auto-correlating header segment is a forward chirp sync segment and wherein said symmetric auto-correlating trailer segment is a reverse chirp sync segment.

21. A method of generating a signal for transmission centered at a predetermined carrier frequency comprising:
generating an auto-correlating header sweeping in frequency an expected frequency error range of the predetermined carrier frequency;
generating a predetermined number of symbols comprising a first data block following the auto-correlating header;
generating a symmetric auto-correlating trailer following the data block; and
generating after the symmetric auto-correlating trailer, a series of additional data blocks, each additional data block followed by at least one of an additional auto-correlating header and trailer, wherein the auto-correlating header, first data block, auto-correlating trailor, additional data blocks, and additional auto-correlating headers and trailers form a pseudorandom noise sequence.

22. A method of generating a signal for transmission centered at a predetermined carrier frequency comprising:
generating an auto-correlating header sweeping in frequency an expected frequency error range of the predetermined carrier frequency;
generating a predetermined number of symbols comprising a first data block following the auto-correlating header;
generating a symmetric auto-correlating trailer following the data block; and
generating after the symmetric auto-correlating trailer, a series of additional data blocks, each additional data block followed by at least one of an additional auto-correlating header and trailer, wherein the auto-correlating header, first data block, auto-correlating trailer, additional data blocks, and additional auto-correlating headers and trailers form a frame synchronization code.

* * * * *